US009742351B2

(12) United States Patent
Choi et al.

(10) Patent No.: US 9,742,351 B2
(45) Date of Patent: Aug. 22, 2017

(54) APPARATUS AND METHOD FOR COLLECTING STATE INFORMATION OF SOLAR MODULE

(71) Applicant: Electronics and Telecommunications Research Institute, Daejeon (KR)

(72) Inventors: Chang Sic Choi, Daejeon (KR); Jin Soo Han, Daejeon (KR); Wan Ki Park, Daejeon (KR); Il Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 452 days.

(21) Appl. No.: 14/304,820

(22) Filed: Jun. 13, 2014

(65) Prior Publication Data
US 2015/0207459 A1  Jul. 23, 2015

(30) Foreign Application Priority Data
Jan. 20, 2014 (KR) .................. 10-2014-0006676

(51) Int. Cl.
*H02S 50/00* (2014.01)
*G05B 15/02* (2006.01)

(52) U.S. Cl.
CPC .............. *H02S 50/00* (2013.01); *G05B 15/02* (2013.01)

(58) Field of Classification Search
CPC ................................ G05B 15/02; H02S 50/00
USPC ........................................................ 700/287
See application file for complete search history.

(56) References Cited

U.S. PATENT DOCUMENTS

| 7,894,339 | B2 | 2/2011 | Lee et al. | |
|---|---|---|---|---|
| 2011/0299421 | A1 | 12/2011 | Werb et al. | |
| 2012/0084027 | A1 | 4/2012 | Caine | |
| 2012/0310427 | A1* | 12/2012 | Williams | G05F 1/67 700/287 |
| 2013/0027219 | A1* | 1/2013 | Myoung | H04Q 9/00 340/870.03 |
| 2013/0279410 | A1* | 10/2013 | Dublin, III | H04W 40/02 370/328 |

FOREIGN PATENT DOCUMENTS

| KR | 10-1234616 | 2/2013 |
|---|---|---|
| KR | 10-2013-0087902 A | 8/2013 |

* cited by examiner

*Primary Examiner* — Kan Yuen
*Assistant Examiner* — Richard Chang

(57) ABSTRACT

The present invention provides an apparatus and method for collecting state information of a solar module, which map a physical shape of a solar module, a string, and an array to a network layer of a modem, a repeater, and a gateway, and receive information about a solar power generation state from a node of an activated lower layer, thereby increasing an efficiency of data collection.

18 Claims, 8 Drawing Sheets

APPARATUS AND METHOD FOR COLLECTING STATE INFORMATION OF SOLAR MODULE

CROSS-REFERENCE TO RELATED APPLICATIONS

This application claims priority under 35 U.S.C. §119 to Korean Patent Application No. 10-2014-0006676, filed on Jan. 20, 2014, the disclosure of which is incorporated herein by reference in its entirety.

TECHNICAL FIELD

The present invention relates to an apparatus and method for collecting state information of a solar module used to generate solar power.

BACKGROUND

Various countermeasures are being developed for coping with global warming, caused by the use of fossil energy, and an energy crisis caused by depletion of the fossil energy. Research is being actively done for technology based on renewable energy using generation of solar power.

A plurality of solar modules are connected and operated for generation of solar power. Generally, a certain number of solar power generation modules are operated as a set of units called string. A plurality of strings are connected to an upper connection board to configure an array, and connected to a data logger.

In order to collect state information of a solar module, application of various communication technologies such as a wired network, such as RS-485 or Ethernet, and a wireless network, such as Zigbee, 2G, 3G, or LTE, was conventionally attempted, and a method, which implements a communication function by using direct current (DC) power generated through generation of solar power, has been recently introduced.

When state information of each solar module is not collected, an entire efficiency of power generation is reduced due to an error of one module.

To solve such a problem, proposed was technology that measures state information of power generation in a string or array end.

Such technology needs to collect state information of each solar module, for detecting and maintaining a solar module (in which efficiency is reduced and breakdown occurs) through periodic monitoring to increase an efficiency of a solar power plant.

SUMMARY

Accordingly, the present invention provides an apparatus and method for collecting state information of a solar module, which map a physical shape of a solar module, a string, and an array to a network layer of a modem, a repeater, and a gateway, and receive information about a solar power generation state from a node of an activated lower layer, thereby increasing an efficiency of data collection.

In one general aspect, an apparatus for collecting state information of a solar module includes: a modem mapped to a solar module, and configured to acquire state information of the solar module according to reception of a module unit data collection request signal, and transmit the acquired state information of the solar module; a repeater mapped to a string, and configured to transmit the module unit data collection request signal to the modem according to reception of a string unit data collection request signal, process the state information of the solar module transmitted from the modem, and transmit the processed state information of the solar module; and a gateway mapped to an array, and configured to transmit the string unit data collection request signal to the repeater, receive the state information of the solar module transmitted from the repeater, and transmit the received state information of the solar module.

The apparatus may further include a data logger configured to receive the state information of the solar module transmitted from the gateway.

The modem, the repeater, and the gateway may acquire an IP address which is allocated according to a predetermined IP address allocation scheme, and may be mapped to the solar module, the string, and the array.

The modem, the repeater, and the gateway may be allocated an IP address which is layered according to a physical layer structure of the solar module, the string, and the array.

The state information of the solar module may include at least one of voltage, current, and temperature information.

The gateway may switch from a sleep mode to an active mode according to a predetermined collection period, and transmit a string unit data collection request signal to a repeater connected to the gateway.

The modem may switch from the sleep mode to the active mode according to a modem activation report period which is shorter than the collection period, and transmit a modem activation report signal, including a number of the modem, to the repeater.

The repeater may receive the modem activation report signal, and increase a counted value for a number of the modem that has transmitted the modem activation report signal.

The repeater transmits the module unit data collection request signal to the modem for which the counted value has increased.

The repeater may switch from the sleep mode to the active mode according to a repeater activation report period which is shorter than the collection period, and transmit a repeater activation report signal, including a number of the repeater, to the gateway.

The gateway may receive the repeater activation report signal, and increase a counted value for a number of the repeater that has transmitted the repeater activation report signal.

The gateway may transmit the string unit data collection request signal to the repeater for which the counted value has increased.

In another general aspect, a method for collecting state information of a solar module includes: receiving a data collection request signal for repeater unit state information; transmitting a module unit state information data collection request signal to a modem, which is included in a lower layer of a repeater and to which an IP address is allocated, according to the received repeater unit state information data collection request signal; receiving state information of a module transmitted according to the module unit state information data collection request signal; and processing the received state information of the module to generate repeater unit data collection information, and transmitting the generated repeater unit data collection information.

The module unit state information may include at least one of voltage, current, and temperature information of a solar module.

The method may further include receiving the repeater unit data collection information, and processing the received repeater unit data collection information to generate gateway unit data collection information, and transmitting the generated gateway unit data collection information.

The method may further include allocating a layered IP address to a modem, the repeater, and a gateway according to a physical layer structure of the module, a string, and an array.

The receiving of a data collection request signal may include receiving the data collection request signal for the repeater unit state information which is transmitted according to a repeater activation report signal which is previously transmitted according to a repeater activation state report period.

The transmitting of a module unit state information data collection request signal may include transmitting a module unit state information data collection request signal to a modem which has transmitted a modem activation report signal according to a modem activation state report period.

The transmitting of a module unit state information data collection request signal may include increasing a counted value for a number of the modem which has transmitted the modem activation report signal.

In another general aspect, a solar power generating system, which includes a solar module, a string, and an array, includes a repeater mapped to the string according to a physical layer structure of the solar module, the string, and the array, allocated a layered IP address, and configured to receive state information of the solar module, and process the received state information of the solar module to generate string unit state information.

Other features and aspects will be apparent from the following detailed description, the drawings, and the claims.

DETAILED DESCRIPTION OF EMBODIMENTS

Hereinafter, embodiments of the present invention will be described in detail with reference to the accompanying drawings.

Figure 1:
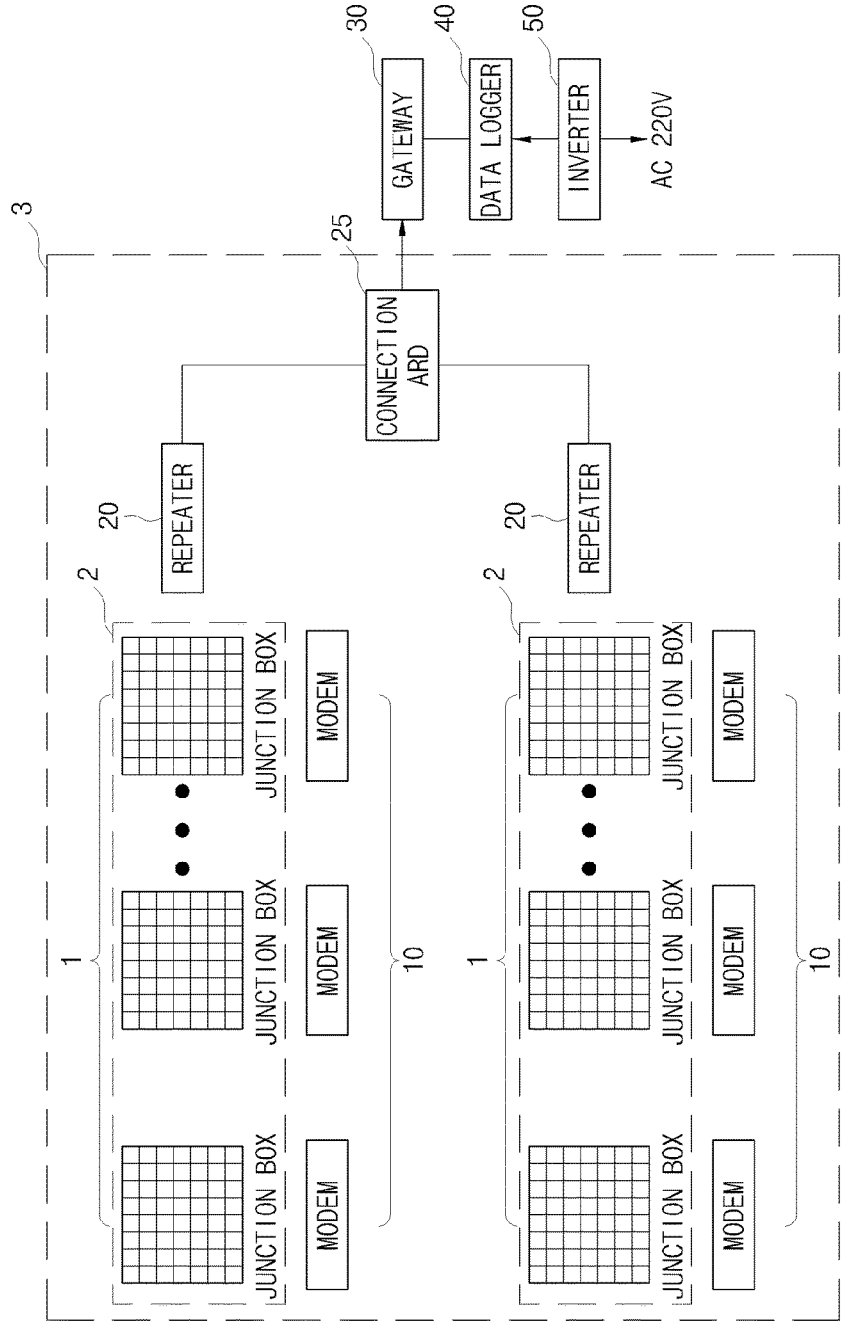
FIG. 1 is a conceptual diagram illustrating an operation of collecting state information in an apparatus for collecting state information of a solar module according to an embodiment of the present invention.
Figure 2:
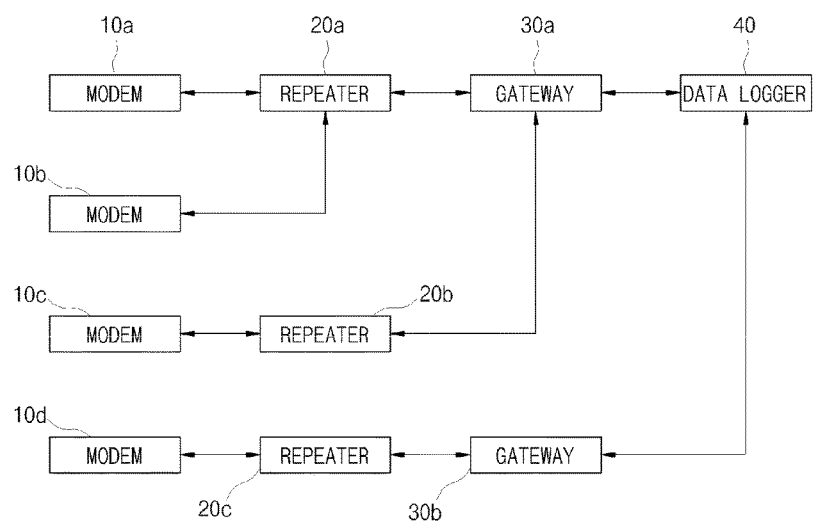
FIG. 2 is an exemplary diagram illustrating a layer structure of a modem, a repeater, a gateway, and a data logger in the apparatus for collecting state information of a solar module according to an embodiment of the present invention.
Figure 3:
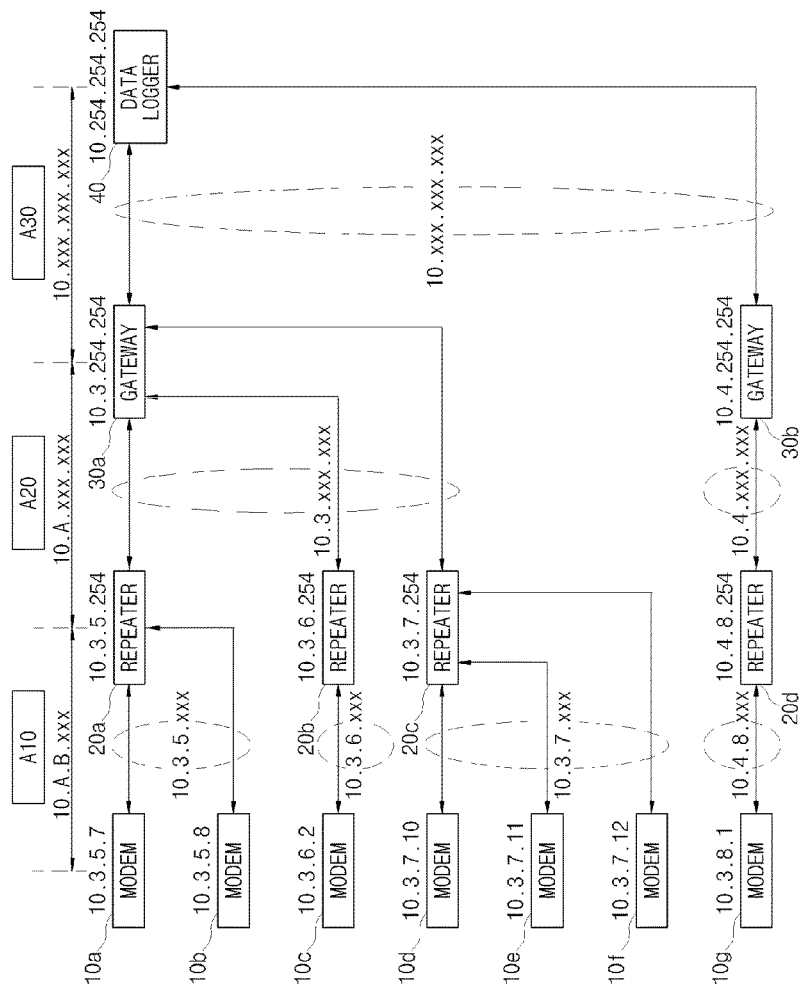
FIGS. 3 and 4 are exemplary diagrams illustrating an operation of allocating an Internet protocol (IP) address and collecting state information according to an embodiment of the present invention.
Figure 4:
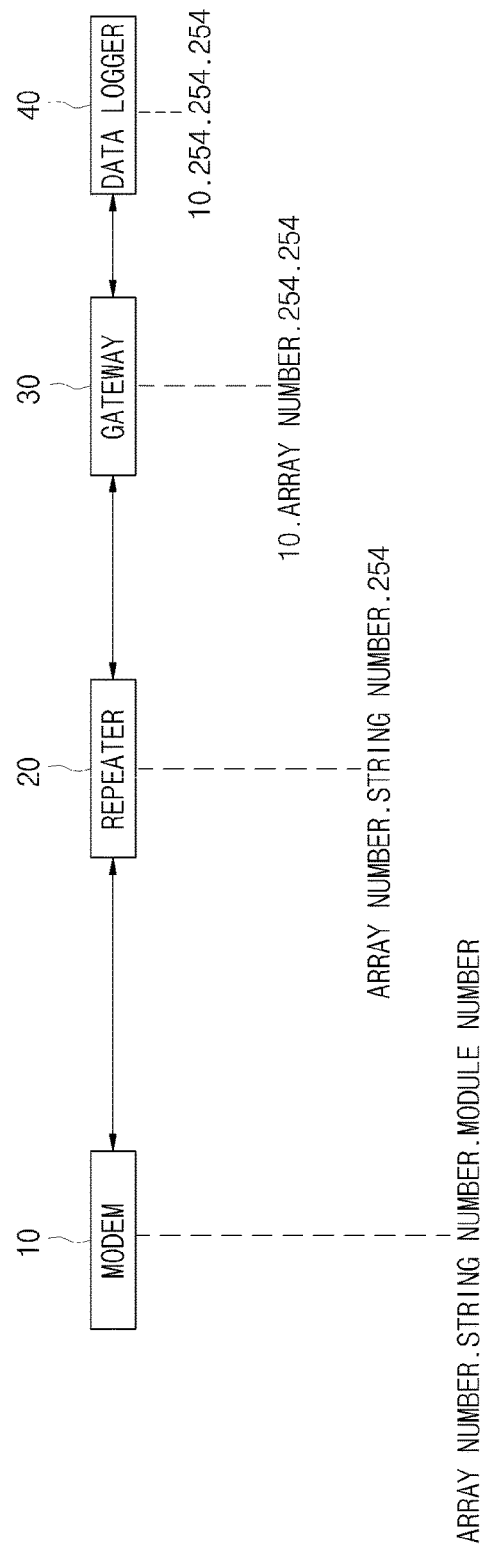

FIG. 1 is a conceptual diagram illustrating an operation of collecting state information in an apparatus for collecting state information of a solar module according to an embodiment of the present invention. FIG. 2 is an exemplary diagram illustrating a layer structure of a modem, a repeater, a gateway, and a data logger in the apparatus for collecting state information of a solar module according to an embodiment of the present invention. FIGS. 3 and 4 are exemplary diagrams illustrating an operation of allocating an Internet protocol (IP) address and collecting state information according to an embodiment of the present invention.

As illustrated in FIGS. 1 to 4, the apparatus for collecting state information of a solar module according to an embodiment of the present invention includes a modem 10, a repeater 20, a gateway 30, and a data logger 40. The modem 10 constructs an IP address-based communication network layer structure, based on a physical layer structure of a solar module 1, a string 2, and an array 3.

In the apparatus for collecting state information of a solar module according to an embodiment of the present invention, the modem 10 is mapped to the solar module 1, acquires state information of the solar module 1 according to reception of a module unit data collection request signal, and transmits the acquired state information of the solar module 1 to the repeater 20.

The repeater 20 is mapped to the string 2, and transmits the module unit data collection request signal to the modem 10 according to reception of a string unit data collection request signal.

Moreover, the repeater 20 receives the state information of the solar module 1 transmitted from the modem 10, and transmits the received state information of the solar module 1 to the gateway 30.

The gateway 30 is mapped to the repeater 20 and the array 3, transmits the string unit data collection request signal to the repeater 20, and transmits the state information of the solar module 1, which is received from the repeater 20, to the data logger 40. Therefore, the data logger 40 receives the state information of the solar module 1 transmitted from the gateway 30.

The modem 10, the repeater 20, and the gateway 30 are mapped to the solar module 1, the string 2, and the array 3, and acquire an IP address which is allocated according to a predetermined IP address allocation scheme.

The IP address, which is layered according to the physical layer structure of the solar module 1, the string 2, and the array 3 in the IP address allocation scheme, is allocated to the modem 10, the repeater 20, and the gateway 30.

FIGS. 1 to 4 are provided for aiding the understanding of those skilled in the art, and illustrate a modem, a repeater, and a gateway which are mapped to some solar modules, strings, and arrays in a solar power generating apparatus.

In a network which is configured with a modem, a repeater, and a gateway, an IP address is allocated to each node for managing a network node.

The modem 10 is equipped in each of a plurality of the solar modules 1 which acquire and transmit state information of the solar module 1, and may use a direct current-power line communication (DC-PLC) scheme that performs a communication function by using DC power generated through generation of solar power.

The modem 10 is mapped to the solar module 1, the repeater 20 is mapped to the string 2, and the gateway 30 is mapped to the array 3.

The modem 10, the repeater 20, and the gateway 30 are allocated the IP address which is layered according to the physical layer structure of the solar module 1, the string 2, and the array 3.

As illustrated in FIG. 2, a structure of the modem 10, the repeater 20, and the gateway 30 is constructed as a layered structure in which one or more the modems 10 are connected to an upper repeater 20, and one or more the repeaters 20 are connected to an upper gateway 30.

According to an embodiment of the present invention, a network layer structure of the modem 10, the repeater 20, and the gateway 30 is constructed based on the physical layer structure of the solar module 1, the string 2, and the array 3, and thus, states of the solar module 1, the string 2, and the array 3 may be intuitively checked, thereby enabling the effective maintenance of the solar module 1.

The modem 10 acquires state information (for example, a voltage, a current, and a temperature) of the solar module 1 to acquire information about a power generation state of the solar module 1, and transmits the acquired state information of the solar module 1 to the repeater 20.

The gateway 30 switches from a sleep mode to an active mode according to a predetermined collection period, and transmits a string unit data collection request signal to the repeater 20 that is an element included in a lower layer of the gateway 30.

The repeater 20 switches from the sleep mode to the active mode according to a repeater activation report period which is shorter than the collection period, and transmits a repeater activation report signal, including a number of the repeater 20, to the gateway 30.

The gateway 30 increases a counted value for a number of the repeater 20 that has transmitted the repeater activation report signal, and transmits the string unit data collection request signal to the repeater 20 for which the counted value has increased.

The modem 10 switches from the sleep mode to the active mode according to a modem activation report period which is shorter than the collection period, and transmits a modem activation report signal, including a number of the modem 10, to the repeater 20.

The repeater 20 increases a counted value for a number of the modem 10 that has transmitted the modem activation report signal, and transmits a module unit data collection request signal to the modem 10 for which the counted value has increased.

FIGS. 3 and 4 are exemplary diagrams illustrating an operation of allocating an IP address and collecting state information according to an embodiment of the present invention.

Referring to FIGS. 3 and 4, an upper fourth byte of IP four numerals is allocated to a section A10 which includes the modem 10 and the repeater 20, and an upper third byte is allocated to a section A20 which includes the repeater 20 and the gateway 30.

Moreover, an upper second byte is allocated to a section A30 which includes the gateway 30 and the data logger 40.

By allocating an address range to each of the sections A10, A20 and A30, a plurality of the modems 10 and the repeater 20 connected to the plurality of modems 10 have an IP address in the same sub-network range.

For example, IP addresses of a plurality of modems 10d to 10f connected to a repeater 20c differ, but the modems 10d to 10f include, in common, a repeater IP address "7" indicating that the same repeater 20c is included as an upper network layer.

IP addresses of a plurality of repeaters 20a to 20c connected to a gateway 30a differ, but the repeaters 20a to 20c include, in common, an IP address "3" of the same gateway 30a.

IP addresses of a plurality of gateways 30a and 30b that is a lower element of the same data logger 40 differ, and the gateways 30a and 30b being included in the same data logger 40 may be determined by using an IP address "10" of the data logger 40.

The plurality of modems 10 and one the repeater 20 have an IP address "ABC.XXX (A: a data logger address, B: a gateway address, C: a repeater address, and XXX: 0 to 255)" in the same sub-network range. In this way, IP addresses "AB.YYY.XXX" and "C.ZZZ.YYY.XXX" in a sub-network range are respectively allocated to a section, including the repeater 20 and the gateway 30, and a section which includes the gateway 30 and the data logger 40.

According to an embodiment of the present invention, an IP network based on a private IP address may be applied based on a structure of a network of the modem 10, the repeater 20, the gateway 30, and the data logger 40. An IP layered network may be applied to a large-scale solar power generating system through 10.ZZZ.YYY.XXX sub-network mapping which corresponds to the broadest range among ranges enabling allocation of a private IP address.

As illustrated in FIG. 4, according to an embodiment of the present invention, the modem 10 is allocated an IP address "10.array number.string number.module number", and the repeater 20 is allocated an IP address "10.array number.string number.254"

The gateway 30 is allocated an IP address "10.array number.254.254", and the data logger 40 is allocated a fixed IP address "10.254.254.254", which is a fixed number, in a range "10.ZZZ.YYY.XXX".

In the repeater 20 and the gateway 30, a fixed address of which a least significant byte is 254 is allocated, and by displaying that a corresponding node is a communication relay node, easiness of management is secured. Also, it is possible to support a communication network structure.

Figure 5:
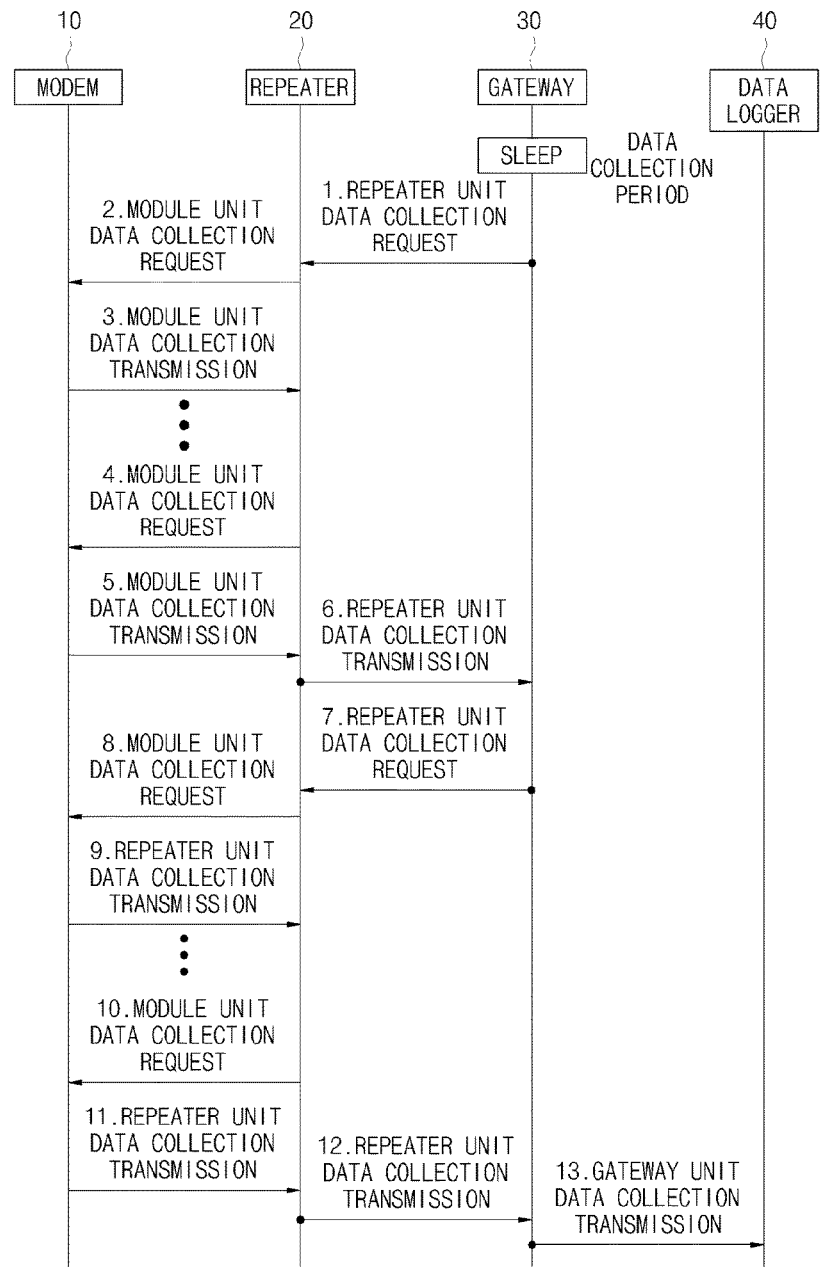
FIG. 5 is a conceptual diagram illustrating an operation of collecting state information of a solar module according to an embodiment of the present invention.
Figure 6:
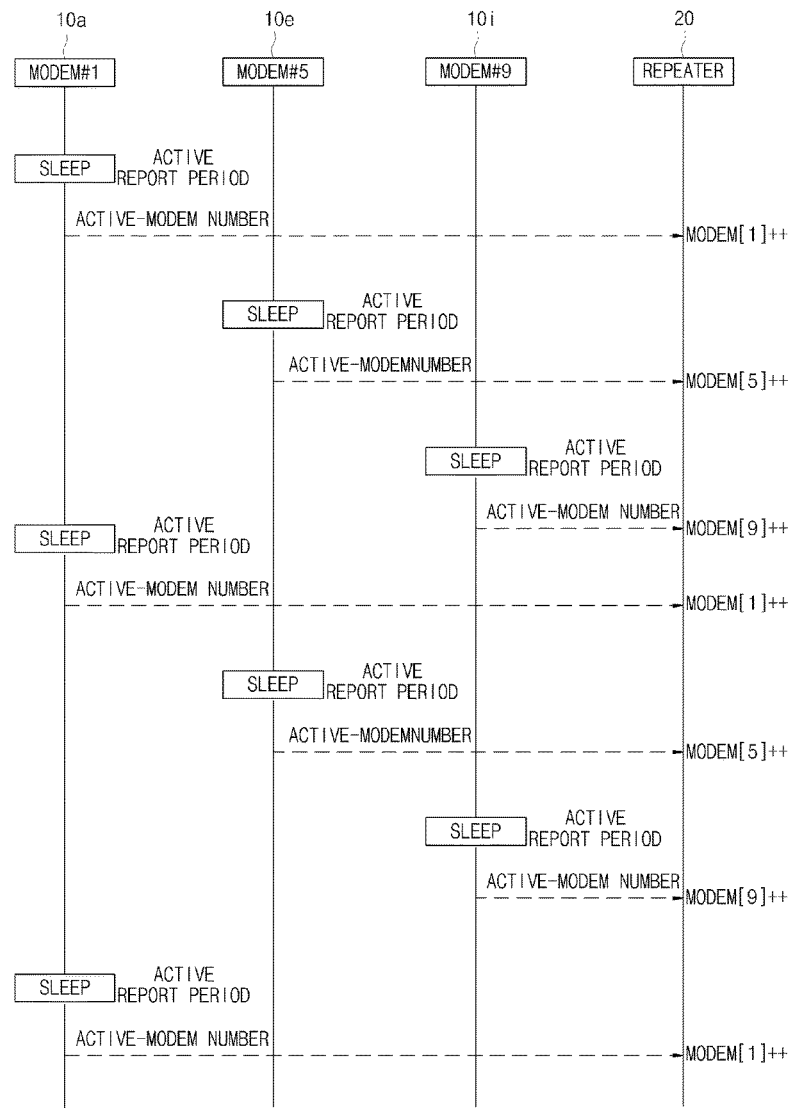
FIG. 6 is a conceptual diagram illustrating an operation of detecting an active node according to an embodiment of the present invention.
Figure 7:
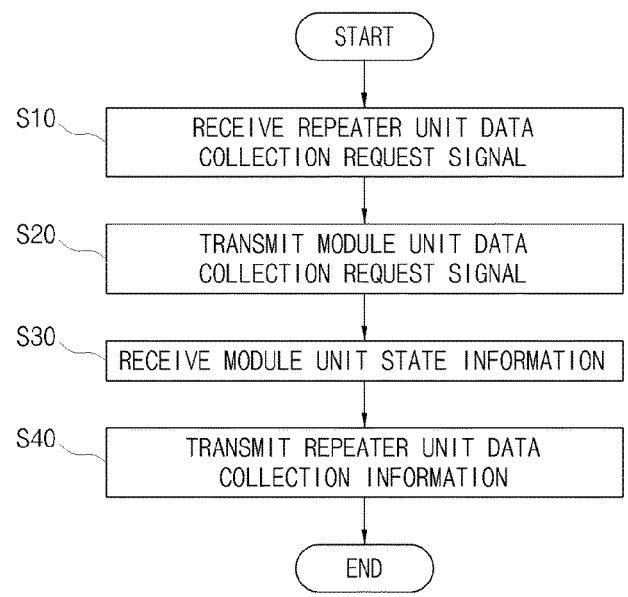
FIG. 7 is a flowchart illustrating a method of collecting state information of a solar module according to an embodiment of the present invention.

FIG. 5 is a conceptual diagram illustrating an operation of collecting state information of a solar module according to an embodiment of the present invention. FIG. 6 is a conceptual diagram illustrating an operation of detecting an active node according to an embodiment of the present invention. FIG. 7 is a flowchart illustrating a method of collecting state information of a solar module according to an embodiment of the present invention.

As illustrated in FIG. 7, in the method of collecting state information of a solar module according to an embodiment of the present invention, a repeater receives a data collection request signal for repeater unit state information from a gateway in step S10.

Subsequently, in step S20, the repeater transmits a module unit state information data collection request signal to a modem, which is included in a lower layer of the repeater and to which an IP address is allocated, according to the repeater unit state information data collection request signal received from the gateway.

Subsequently, in step S30, the repeater receives module state information, corresponding to the module unit state information data collection request signal, from the modem.

In step S40, the repeater processes the module state information received from the modem to generate repeater unit data collection information, and transmits the generated repeater unit data collection information to the gateway. Here, the module unit state information includes at least one of voltage, current, and temperature information.

The gateway receives the repeater unit data collection information from the repeater, processes the received repeater unit data collection information to generate gateway unit data collection information, and transmits the generated gateway unit data collection information to a data logger.

To perform operations of the method of collecting state information of a solar module according to an embodiment of the present invention, a layered IP address may be first allocated to a modem, a repeater, and a gateway according to a physical layer structure of a module, a string, and an array.

In step S10, the repeater receives the data collection request signal for the repeater unit state information which is transmitted according to the repeater activation report signal which is previously transmitted according to the repeater activation state report period. Here, the repeater activation state report period is shorter than a collection period of the gateway.

Moreover, in step S10, the repeater receives the data collection request signal for the repeater unit state information which is transmitted to the repeater having the active mode, according to the repeater activation report signal.

In step S20, the repeater transmits the module unit state information data collection request signal to the modem, which transmits the modem activation report signal, according to a modem activation state report period which is shorter than the collection period of the gateway.

Furthermore, the repeater increases a counted value for a number of a modem that has transmitted the modem activation report signal, and transmits the module unit state information data collection request signal to the modem for which the counted value has increased.

That is, in steps S10 and S20, the repeater receives state information from an activated node to increase an efficiency of data collection, based on an activation state report of a solar module and the repeater.

As illustrated in FIG. 5, the gateway 30 collects and processes state information of the solar module 1 at every collection period in an IP address-based network structure, and transfers the processed state information to the data logger 40.

The gateway 30 has the sleep mode until the collection period. However, when the collection period arrives, the gateway 30 requests data collection from each repeater 20 included in a lower layer of the gateway 30 (1. repeater unit data collection request), and the repeater 20 which receives a data collection request message from the gateway 30 transfers a module unit data collection request message to each modem 10 included in a lower layer of the repeater 20 (2. module unit data collection request).

Each modem 10 collects state information (for example, a voltage, a current, and a temperature) of a module according to the received data collection request message, and changes the collected state information to a standardized data format to transfer the changed state information to an upper repeater 20 (3. module unit data collection transmission).

The repeater 20 processes data of a module collected from a lower modem 10, adds a number of the string 2 to the processed data, and transfers the data to the gateway 30 (6. repeater unit data collection transmission).

Each gateway 30 changes data, collected from lower repeaters 20, to one data format, adds a number of the array 3 (mapped to the gateway 30) to the data, and transfers the data to the data logger 40 (12. gateway unit data collection transmission). The above-described operation of collecting, processing, and transferring the state information is identically repeated at every data collection period, and thus, its detailed description is not repeated.

As illustrated in FIG. 6, an active node detecting operation according to an embodiment of the present invention detects an activated node for the repeater 20 (included in the lower layer of the gateway 30) and the modem 10 included in the lower layer of the repeater 20, and requests state information from only a node which is activated and operates among nodes connected to a lower layer, thereby increasing an efficiency of a data collection procedure.

A plurality of modems 10a, 10e and 10i switch from the sleep mode to the active mode according to an activation report period which is individually set, and transmits a modem activation report signal to the repeater 20. Here, the activation report period is set shorter than the collection period of the gateway 30.

The repeater 20, which receives the modem activation report signal (an active-modem number) including a modem number from the modem 10, increases a counted value for the modem number, and thus manages the activation report signal received from the activated modem 10.

For example, the repeater 20 which receives the modem activation report signal (an active-modem number) from the modem 10a increases a counted value for a corresponding modem number (a modem [1]).

As described above, the repeater 20 switches from the sleep mode to the active mode according to a repeater activation report period, and when a counted value for the modem 10a increases in a collection period, the repeater 20 transmits the module unit data collection request signal to the modem 10a.

The repeater 20 regards, as an active node, a lower node (a modem) for which a counted value has increased by at least one or more in the collection period according to the modem activation report signal and the counted value, and transmits a state information collection request message to the active node.

FIG. 6 is a conceptual diagram illustrating an operation of detecting an active node between the modem 10 and the repeater 20 according to an embodiment of the present invention, for aiding the understanding of those skilled in the art. That is, the gateway 30 transmits a data collection request signal for repeater unit state information to an activated repeater 20 by using a counted value of each repeater 20.

The repeater 20 transmits a module unit state information data collection request signal to a plurality of activated modems 10 by using a counted value for each activated modem 10.

Since a data collection request message is not transmitted to a node which is not connected to a network or is not activated, data traffic is reduced on the network, and a performance of data collection is enhanced.

The an apparatus and method for collecting state information of a solar module, according to the embodiments of the present invention, periodically check an active node (a modem, a repeater, or a gateway) to transmit a state information collection request signal to an activated node, receive state information from the activated node, and increase an efficiency of data collection.

In collecting power generation state information of a solar module, an IP address is allocated according to a physical layer structure of a module, a string, and an array, and a network layer structure of a modem, a repeater, and a gateway is constructed. Accordingly, the power generation state information of the solar module is efficiently acquired.

Moreover, solar power generation state information is received over a sub-network based on an IP address, and thus, general usability and compatibility with the existing IP-based communication software are secured.

An embodiment of the present invention may be implemented in a computer system, e.g., as a computer readable medium.

Figure 8:
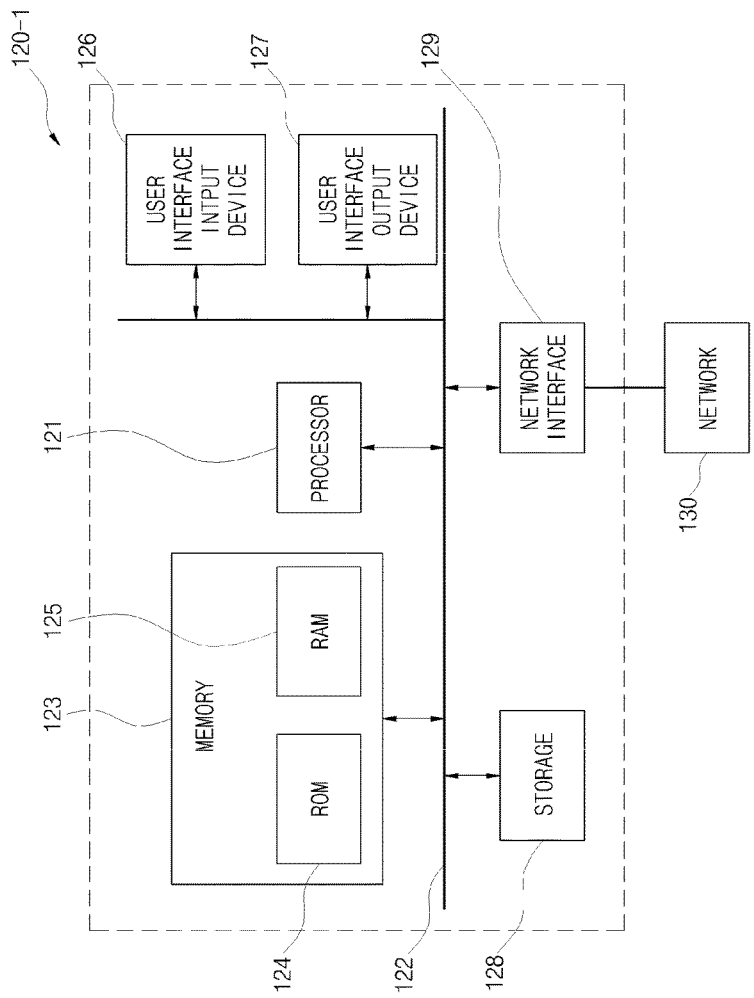
FIG. 8 is a block diagram illustrating a computer system to which the present invention is applied.

FIG. 8 is a block diagram illustrating a computer system to which the present invention is applied.

As shown in FIG. 8, a computer system 120-1 may include one or more of a processor 121, a memory 123, a user input device 126, a user output device 127, and a storage 128, each of which communicates through a bus 122. The computer system 120-1 may also include a network interface 129 that is coupled to a network 130. The processor 121 may be a central processing unit (CPU) or a semiconductor device that executes processing instruction stored in the memory 123 and/or the storage 128. The memory 123 and the storage may include various forms of volatile or non-volatile storage media. For example, the memory 123 may include a read-only memory (ROM) 124 and a random access memory (RAM) 125.

Accordingly, an embodiment of the invention may be implemented as a computer implemented method or as a non-transitory computer readable medium with computer executable instruction stored thereon. In an embodiment, when executed by the processor, the computer readable instruction may perform a method according to at least one aspect of the invention.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for collecting state information of a solar module, the apparatus comprising:
a modem mapped to a solar module, and configured to acquire state information of the solar module according to reception of a module unit data collection request signal, and transmit the acquired state information of the solar module;
a repeater mapped to a string, and configured to transmit the module unit data collection request signal to the modem according to reception of a string unit data collection request signal, process the state information of the solar module transmitted from the modem, and transmit the processed state information of the solar module; and
a gateway mapped to an array, and configured to transmit the string unit data collection request signal to the repeater, receive the state information of the solar module transmitted from the repeater, and transmit the received state information of the solar module, wherein the gateway switches from a sleep mode to an active mode according to a predetermined collection period, and transmits a string unit data collection request signal to a repeater connected to the gateway.

2. The apparatus of claim 1, further comprising a data logger configured to receive the state information of the solar module transmitted from the gateway.

3. The apparatus of claim 1, wherein the modem, the repeater, and the gateway acquire an IP address which is allocated according to a predetermined IP address allocation scheme, and are mapped to the solar module, the string, and the array.

4. The apparatus of claim 3, wherein the modem, the repeater, and the gateway are allocated an IP address which is layered according to a physical layer structure of the solar module, the string, and the array.

5. The apparatus of claim 4, wherein the state information of the solar module comprises at least one of voltage, current, and temperature information.

6. The apparatus of claim 1, wherein the modem switches from the sleep mode to the active mode according to a modem activation report period which is shorter than the collection period, and transmits a modem activation report signal, including a number of the modem, to the repeater.

7. The apparatus of claim 6, wherein the repeater receives the modem activation report signal, and increases a counted value for a number of the modem that has transmitted the modem activation report signal.

8. The apparatus of claim 7, wherein the repeater transmits the module unit data collection request signal to the modem for which the counted value has increased.

9. The apparatus of claim 1, wherein the repeater switches from the sleep mode to the active mode according to a repeater activation report period which is shorter than the collection period, and transmits a repeater activation report signal, including a number of the repeater, to the gateway.

10. The apparatus of claim 9, wherein the gateway receives the repeater activation report signal, and increases a counted value for a number of the repeater that has transmitted the repeater activation report signal.

11. The apparatus of claim 10, wherein the gateway transmits the string unit data collection request signal to the repeater for which the counted value has increased.

12. A method for collecting state information of a solar module, the method comprising:
receiving a data collection request signal for repeater unit state information;
transmitting a module unit state information data collection request signal to a modem, which is included in a lower layer of a repeater and to which an IP address is allocated, according to the received repeater unit state information data collection request signal;
receiving state information of a module transmitted according to the module unit state information data collection request signal; and
processing the received state information of the module to generate repeater unit data collection information, and transmitting the generated repeater unit data collection information,
wherein the receiving of a data collection request signal comprises receiving the data collection request signal for the repeater unit state information which is transmitted according to a repeater activation report signal which is previously transmitted according to a repeater activation state report period.

13. The method of claim 12, wherein the module unit state information comprises at least one of voltage, current, and temperature information of a solar module.

14. The method of claim 12, further comprising:
receiving the repeater unit data collection information;
processing the received repeater unit data collection information to generate gateway unit data collection information; and
transmitting the generated gateway unit data collection information.

15. The method of claim 12, further comprising allocating a layered IP address to a modem, the repeater, and a gateway according to a physical layer structure of the module, a string, and an array.

16. The method of claim 15, wherein the transmitting of a module unit state information data collection request signal further comprises transmitting a module unit state information data collection request signal to a modem which has transmitted a modem activation report signal according to a modem activation state report period.

17. The method of claim 16, wherein the transmitting of a module unit state information data collection request signal comprises increasing a counted value for a number of the modem which has transmitted the modem activation report signal.

18. A solar power generating system comprising:
a modem;
a solar module;
a string;
an array; and
a repeater mapped to the string according to a physical layer structure of the solar module, the string, and the array, allocated a layered IP address, and configured to receive state information of the solar module, and process the received state information of the solar module to generate string unit state information,
wherein the repeater receives a string unit data collection request signal from a gateway that switches from a sleep mode to an active mode according to a predetermined collection period, and transmits a module unit data collection request signal to the modem in response to the received string unit data request signal.

\* \* \* \* \*